United States Patent
Kang et al.

(10) Patent No.: US 8,279,201 B2
(45) Date of Patent: Oct. 2, 2012

(54) TOUCH SCREEN PANEL AND METHOD OF FABRICATING THE SAME

(75) Inventors: Sung-Ku Kang, Suwon-si (KR); Tae-Hyeog Jung, Suwon-si (KR); Jin-Guen Kim, Suwon-si (KR); Gi-Min Kim, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 649 days.

(21) Appl. No.: 12/464,603

(22) Filed: May 12, 2009

(65) Prior Publication Data

US 2010/0007621 A1    Jan. 14, 2010

(30) Foreign Application Priority Data

Jul. 11, 2008    (KR) .................. 10-2008-0067375

(51) Int. Cl.
G06F 3/042    (2006.01)
(52) U.S. Cl. ........................ 345/176; 345/175
(58) Field of Classification Search .......... 345/173–180; 178/18.01–18.07, 20.01–20.04
See application file for complete search history.

(56) References Cited

U.S. PATENT DOCUMENTS

| | | | |
|---|---|---|---|
| 5,889,236 A | 3/1999 | Gillespie et al. | |
| 7,663,607 B2 * | 2/2010 | Hotelling et al. | 345/173 |
| 2004/0119701 A1 | 6/2004 | Mulligan et al. | |
| 2005/0083307 A1 | 4/2005 | Aufderheide et al. | |
| 2006/0097991 A1 * | 5/2006 | Hotelling et al. | 345/173 |
| 2008/0138589 A1 | 6/2008 | Wakabayashi et al. | |
| 2008/0264699 A1 * | 10/2008 | Chang et al. | 178/18.01 |
| 2009/0066670 A1 * | 3/2009 | Hotelling et al. | 345/174 |
| 2009/0096757 A1 * | 4/2009 | Hotelling et al. | 345/173 |
| 2009/0096758 A1 | 4/2009 | Hotelling et al. | |

FOREIGN PATENT DOCUMENTS

| | | |
|---|---|---|
| JP | 57-104433 | 6/1982 |
| JP | 58-198814 | 11/1983 |
| JP | 58-211244 | 12/1983 |
| JP | 11-511580 | 10/1999 |
| JP | 2007-533044 | 11/2007 |
| KR | 10-2007-0017296 | 2/2007 |
| KR | 10-2008-0019125 | 3/2008 |
| KR | 10-2008-0043414 | 5/2008 |
| WO | WO 2005/114369 A2 | 12/2005 |
| WO | WO 2006/126604 A1 | 11/2006 |

OTHER PUBLICATIONS

European Search Report dated Aug. 17, 2009, for corresponding European application 09160339.9, noting listed references in this IDS.
Japanese Office action dated May 31, 2011, for corresponding Japanese Patent application 2009-012220, noting listed references in this IDS, 2 pages.

* cited by examiner

Primary Examiner — Vijay Shankar
(74) Attorney, Agent, or Firm — Christie, Parker & Hale, LLP

(57) ABSTRACT

A touch screen panel having an improved reflectance difference between sensing patterns. The touch screen panel includes a transparent substrate; a plurality of first sensing patterns on the transparent substrate and connected along a first direction; a first insulating layer on the first sensing patterns; and a plurality of second sensing patterns on the first insulating layer and connected along a second direction. The second sensing patterns are alternately disposed with the first sensing patterns and not overlapped with the first sensing patterns. The touch screen panel further includes a plurality of dummy patterns in at least one of first dummy regions between the first sensing patterns and second dummy regions between the second sensing patterns.

14 Claims, 9 Drawing Sheets

TOUCH SCREEN PANEL AND METHOD OF FABRICATING THE SAME

CROSS-REFERENCE TO RELATED APPLICATIONS

This application claims priority to and the benefit of Korean Patent Application No. 10-2008-0067375, filed on Jul. 11, 2008, in the Korean Intellectual Property Office, the entire content of which is incorporated herein by reference.

BACKGROUND OF THE INVENTION

1. Field of the Invention

The present invention relates to a touch screen panel and a method of fabricating the same.

2. Description of Related Art

A touch screen panel is an input device that is capable of inputting a user's instruction to an image display device or the like by allowing the user to select instructions displayed on a screen of the image display device with the user's hand or an object.

To this end, a touch screen panel is provided on a front face of an image display device to convert a contact position on the touch screen panel into an electrical signal. At the contact position, a user's hand or an object is directly in contact with the touch screen panel. Accordingly, an instruction content selected at the contact position is inputted as an input signal to the image display device.

Since such a touch screen panel can be used as a substitute for a separate input device which is operated and connected to the image display device, such as a keyboard and/or a mouse, its application fields have been gradually expanded.

Touch screen panels are classified into a resistive overlay type touch screen panel, an infrared beam type touch screen panel, a capacitive overlay type touch screen panel, and the like.

Among these touch screen panels, the capacitive overlay type touch screen panel converts a contact position of the touch screen panel into an electrical signal by sensing changes in capacitance formed between a conductive sensing pattern and another sensing pattern adjacent to the conductive sensing pattern, a ground electrode, or the like when a user's hand or an object is in contact with the touch screen panel.

In order to determine an exact contact position on a contact surface, the sensing patterns include first sensing patterns (X-patterns) formed along a first direction to be connected to one another, and second sensing patterns (Y-patterns) formed along a second direction to be connected one another.

The first and second sensing patterns are generally formed in the same layer. In this case, sensing patterns arranged on the same lines of the X-patterns or the Y-patterns are connected by forming separate connection patterns through contact holes formed in an insulating layer formed on the sensing patterns. Therefore, more masks may be required, and a fabrication process may be complicated.

Furthermore, the touch screen panel is positioned on a display panel such as a liquid crystal display panel. Light emitted from the display panel is transmitted through the touch screen panel and reaches a user. External light incident from the outside of the touch screen panel is reflected by the sensing patterns formed in the touch screen panel. Therefore, in order to display a uniform image, it is desirable to improve a reflectance difference between the sensing patterns.

SUMMARY OF THE INVENTION

Accordingly, it is an aspect of the present invention to provide a touch screen panel and a method of fabricating the same using fewer masks, having a simple process, and improving a reflectance difference between sensing patterns.

According to an embodiment of the present invention, there is provided a touch screen panel including a transparent substrate; a plurality of first sensing patterns on the transparent substrate and connected to each other along a first direction; a first insulating layer on the first sensing patterns; a plurality of second sensing patterns on the first insulating layer and connected to each other along a second direction, the second sensing patterns being alternately disposed with the first sensing patterns and not overlapped with the first sensing patterns; and a plurality of dummy patterns in at least one of first dummy regions between the first sensing patterns or second dummy regions between the second sensing patterns.

The dummy patterns may be formed of the same material as the first sensing patterns on the transparent substrate and beneath the second sensing patterns to overlap with the second sensing patterns. The dummy patterns may be formed of the same material as the second sensing patterns on the first insulating layer and on the first sensing patterns to overlap with the first sensing patterns. The dummy patterns may be separated from each other.

The dummy patterns may include a plurality of first dummy patterns on the transparent substrate in the first dummy regions between the first sensing patterns, and a plurality of second dummy patterns on the first insulating layer in the second dummy regions between the second sensing patterns. The first dummy patterns may overlap with the second sensing patterns, and the second dummy patterns may overlap with the first sensing patterns. The first dummy patterns and the second dummy patterns alternately on the respective transparent substrate and first insulating layer, and portions of edge regions of the first and second dummy patterns may overlap with each other.

According to another embodiment of the present invention, there is provided a method of fabricating a touch screen panel, the method includes forming a plurality of first sensing patterns on a transparent substrate, the plurality of first sensing patterns connected to each other along a first direction; forming a first insulating layer on the first sensing patterns; and forming a plurality of second sensing patterns on the first insulating layer, the plurality of second sensing patterns connected to each other along a second direction, the second sensing patterns being alternately disposed with the first sensing patterns and not overlapped with the first sensing patterns; and forming a plurality of dummy patterns in at least one of first dummy regions between the first sensing patterns and second dummy regions between the second sensing patterns.

The dummy patterns may include first dummy patterns in the first dummy regions between the first sensing patterns on the transparent substrate and second dummy patterns in the second dummy regions between the second sensing patterns on the first insulating layer, and the first dummy patterns and the second dummy patterns are alternately on the respective transparent substrate and the first insulating layer, and portions of edge regions of the first dummy patterns and the second dummy patterns overlap with each other.

According to the embodiments of the present invention, the first sensing patterns connected to each other along a first direction and the second sensing patterns connected to each other along a second direction are on different layers. Accordingly, the number of masks can be decreased, and a fabrication process can be simplified.

Further, the dummy patterns are formed in dummy regions between the first sensing patterns and/or in dummy regions between the second sensing patterns. Accordingly, the first and second sensing patterns are on different layers, respectively, so that a reflectance difference between the first and second sensing patterns can be improved.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1:
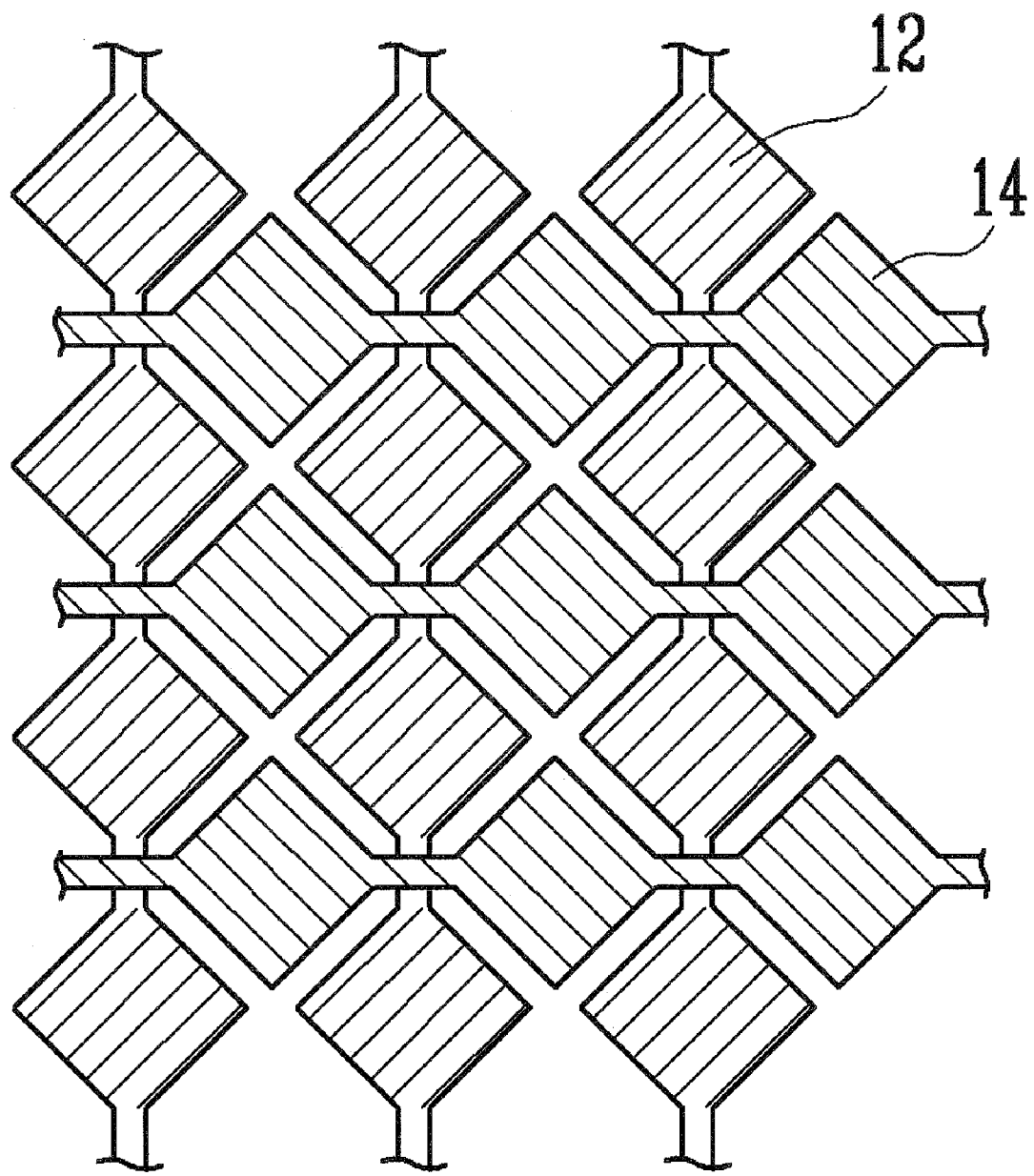
FIG. 1 is a schematic drawing illustrating a plan view of an arrangement of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is a schematic drawing illustrating a plan view of an arrangement of sensing patterns according to an embodiment of the present invention.

Referring to FIG. 1, the sensing patterns according to the embodiment of the present invention include first and second sensing patterns 12 and 14 extending and crossing with each other. The first sensing patterns 12 are formed so that first sensing patterns 12 having the same X-coordinate (e.g., same column position) are connected to one another in one column. The second sensing patterns 14 are formed so that second sensing patterns 14 having the same Y-coordinate (e.g., same row position) are connected to one another in one row.

For example, the first sensing patterns 12 may include a plurality of X-patterns extending along a first direction (column direction) so that sensing patterns having the same X-coordinate are connected together in one column. The second sensing patterns 14 may include a plurality of Y-patterns extending along a second direction (row direction) so that sensing patterns having the same Y-coordinate are connected together in one row.

However, in the embodiment shown FIG. 1, the first and second sensing patterns 12 and 14 are arranged in different layers, respectively. For example, the first sensing patterns 12 may be formed in a lower layer, and the second sensing patterns 14 may be formed in an upper layer. An insulating layer (not shown) is interposed between the first and second sensing patterns 12 and 14.

When the first and second sensing patterns 12 and 14 are respectively arranged in different layers as described above, first sensing patterns 12 positioned in the same column can be connected to one another while being patterned. In addition, second sensing patterns 14 positioned in the same row can be connected to one another while being patterned.

Accordingly, a process of forming separate contact holes and connection patterns is omitted, so that fewer masks are required, and a fabrication process can be simplified.

Figure 2:
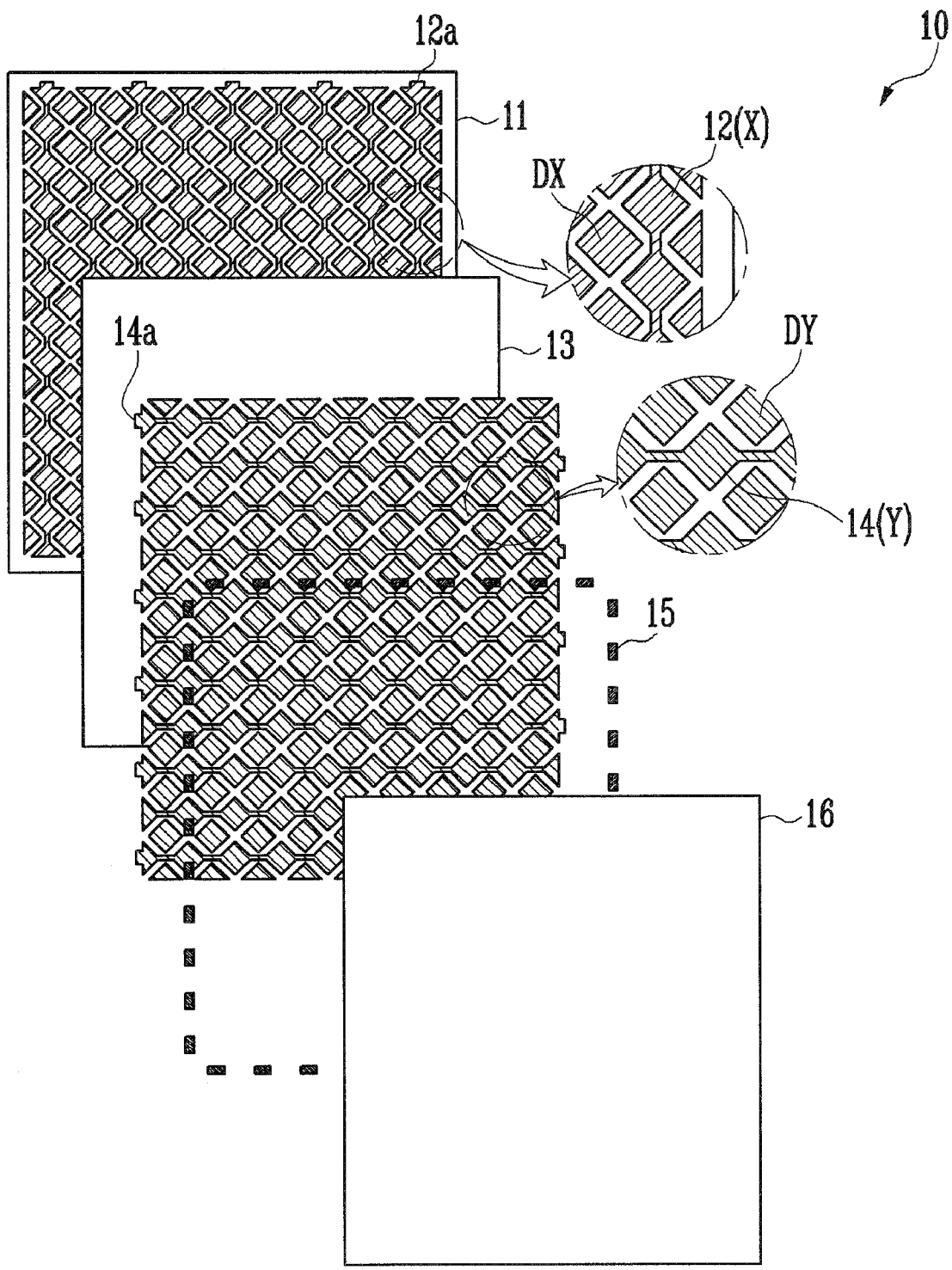
FIG. 2 is a schematic drawing illustrating an exploded plan view of a touch screen panel according to an embodiment of the present invention.
Figure 3:
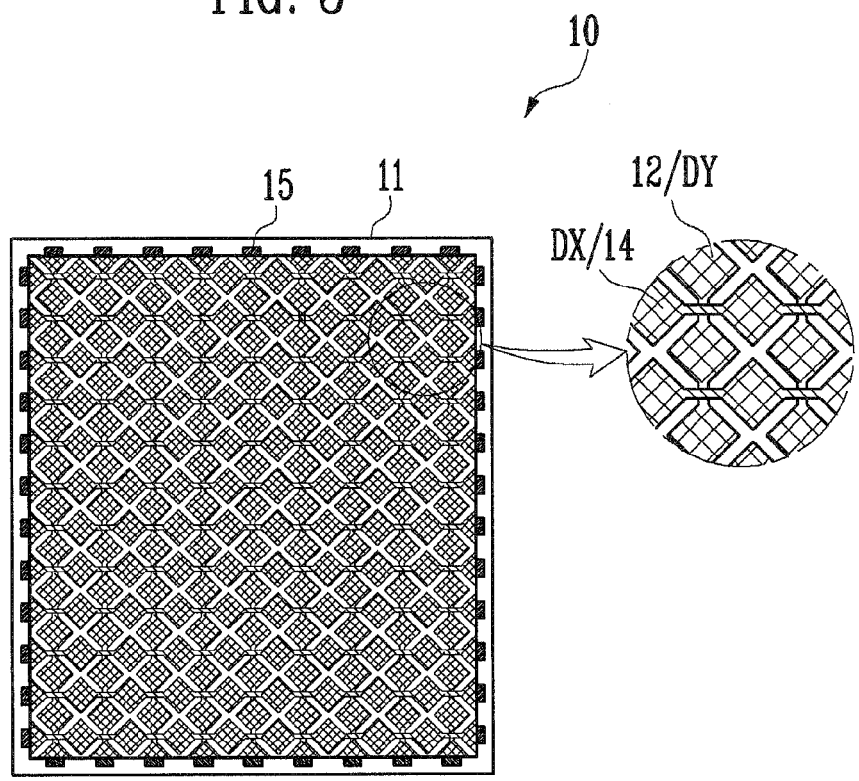
FIG. 3 is a schematic drawing illustrating an assembled plan view of the touch screen panel shown in FIG. 2.

FIG. 2 is a schematic drawing illustrating an exploded plan view of a touch screen panel according to an embodiment of the present invention. FIG. 3 is a schematic drawing illustrating an assembled plan view of the touch screen panel shown in FIG. 2.

Referring to FIGS. 2 and 3, the touch screen panel 10 according to the embodiment of the present invention includes a transparent substrate 11, first sensing patterns 12, a first insulating layer 13, second sensing patterns 14, metal patterns 15 and a second insulating layer 16. The first sensing patterns 12, the first insulating layer 13, the second sensing patterns 14, the metal patterns 15 and the second insulating layer 16 are sequentially formed on the transparent substrate 11. Here, a plurality of dummy patterns DX and DY are formed in dummy regions between the first sensing patterns 12 and in dummy regions between the second sensing patterns 14, respectively.

The first sensing patterns 12 are formed on one surface of the transparent substrate 11 to be connected to each other along a first direction. For example, the first sensing patterns 12 are formed in a regular pattern such as a diamond pattern to be in close contact with adjacent first sensing patterns 12. The first sensing patterns 12 may include a plurality of X-patterns formed so that first sensing patterns 12 having the same X-coordinate are connected to one another in one column. Here, the shape of the first sensing patterns 12 is not limited to a diamond shape but may be formed in various shapes so that the first sensing patterns 12 can be in close contact with adjacent first sensing patterns 12.

The first sensing patterns 12 have pads 12a through which the first sensing patterns 12 are electrically connected to the metal patterns 15. The pads 12a of the first sensing patterns 12 may be alternately provided at top and bottom sides of the columns, or may be provided at any one of the top and bottom sides of the columns. Alternatively, the pads 12a of the first sensing patterns 12 may be provided at both of the top and bottom sides of the columns.

However, the first sensing patterns 12 are not formed in regions at which the first sensing patterns 12 would have overlapped with the second sensing patterns 14. Instead, the X-dummy patterns DX (first dummy patterns) are formed in the dummy regions between the first sensing patterns 12, i.e., dummy regions on the transparent substrate 11 including the regions at which the first sensing patterns 12 would have overlapped with the second sensing patterns 14.

The first sensing patterns 12 and the X-dummy patterns DX are formed of the same material in the same process. Here, the first sensing patterns 12 and the X-dummy patterns DX are formed of a transparent electrode material so that light emitted from a display panel (not shown) disposed beneath the touch screen panel 10 can be transmitted through the touch screen panel 10. For example, the first sensing patterns 12 and the X-dummy patterns DX may be formed of indium tin oxide (hereinafter, referred to as "ITO") patterns having a thickness of 100 to 300 Å.

The first insulating layer 13 is formed on the first sensing patterns 12 and the X-dummy patterns DX to cover them. For example, the first insulating layer 13 may be formed to a thickness of 400 to 1000 Å on the first sensing patterns 12 and the X-dummy patterns DX.

The second sensing patterns 14 are formed on the first insulating layer 13 and are connected to each other along a second direction. The second sensing patterns 14 are alternately disposed with the first sensing patterns 12, and not overlapped with the first sensing patterns 12. For example, the second sensing patterns 14 are formed in the same diamond pattern as that of the first sensing patterns 12 and are in close contact with adjacent second sensing patterns 14. The second sensing patterns 14 may include a plurality of Y-patterns formed so that second sensing patterns 14 having the same Y-coordinate are connected to one another in one row.

The second sensing patterns 14 have pads 14a through which the second sensing patterns 14 are electrically connected to the metal patterns 15. The pads 14a of the second sensing patterns 14 may be alternately provided at top and bottom sides of the rows, or may be provided at any one of the top and bottom sides of the rows. Alternatively, the pads 14a of the second sensing patterns 14 may be provided at both of the top and bottom sides of the rows.

The Y-dummy patterns DY (second dummy patterns) are formed in the dummy regions between the second sensing patterns 14, i.e., dummy regions on the first insulating layer 13 including the regions at which the second sensing patterns 14 would have overlapped with the first sensing patterns 12.

The second sensing patterns 14 and the Y-dummy patterns DY are formed of the same material in the same process. Here, the second sensing patterns 14 and the Y-dummy patterns DY are formed of the same transparent electrode material as the first sensing patterns 12 and the X-dummy patterns DX. For example, the second sensing patterns 14 and the Y-dummy patterns DY may be formed of ITO patterns having a thickness of 100 to 300 Å.

The metal patterns 15 are disposed at edge regions of the regions at which the first and second sensing patterns 12 and 14 are formed, particularly at regions corresponding to the pads 12a and 14a of the first and second sensing patterns 12 and 14. The metal patterns 15 allow respective sensing patterns 12 or 14 positioned on a column or row to be electrically connected to position detecting lines (not shown) so that a contact position detection signal is supplied to a driving circuit (not shown).

The second insulating layer 16 is formed on the second sensing patterns 14 and the Y-dummy patterns DY to cover them. For example, the second insulating layer 16 may be formed to a thickness of 400 to 1000 Å on the second sensing patterns 14 and the Y-dummy patterns DY. The second insulating layer 16 may be omitted depending on the design of the touch screen panel according to some embodiments of the present invention.

When a user's hand or an object is in contact with the touch screen panel 10 with the respective components assembled as shown in FIG. 3, a change in capacitance at the contact position is transferred to the driving circuit via the first and second sensing patterns 12 and 14, the metal patterns 15 and the contact position detection lines. The change in capacitance is converted into an electrical signal by X and Y input processing circuits (not shown) and the like, so that the contact position is detected.

In the touch screen panel 10, the X- and Y-dummy patterns DX and DY have patterns separated from each other. The X- and Y-dummy patterns DX and DY do not perform the function of sensing a contact position, and the like.

However, the X-dummy patterns DX are disposed beneath the second sensing patterns 14 to overlap with the second sensing patterns 14, and the Y-dummy patterns DY are disposed on the first sensing patterns 12 to overlap with the first sensing patterns 12. Accordingly, although the first and second sensing patterns 12 and 14 are disposed in different layers, respectively, a reflectance difference between the first and second sensing patterns 12 and 14 can be improved. Detailed description will be described later with reference to FIG. 4.

Figure 4:
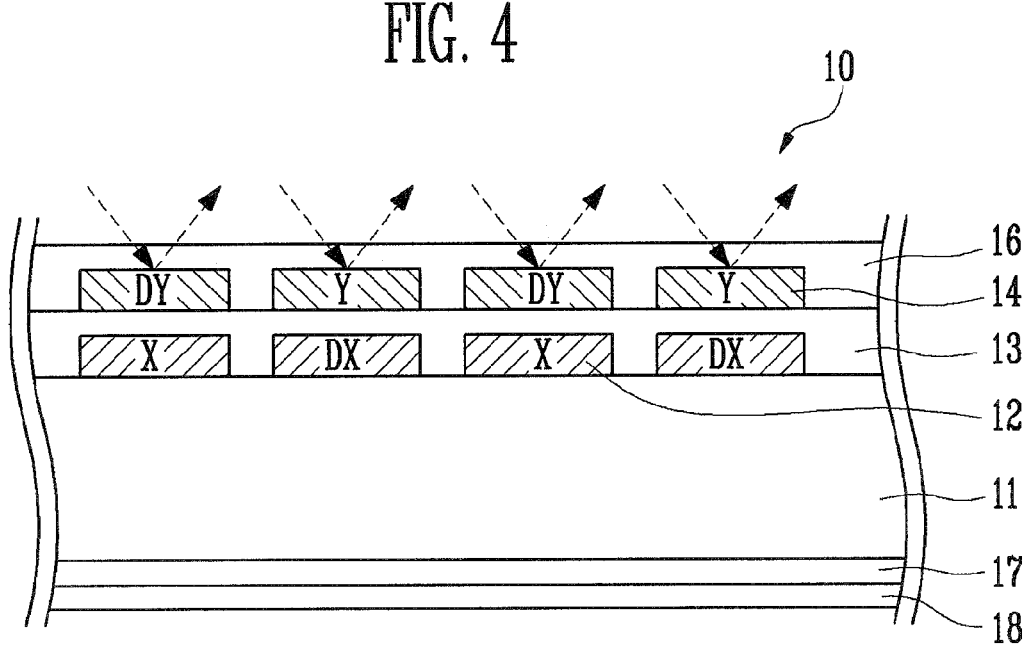
FIG. 4 is a schematic drawing illustrating an assembled cross-sectional view of a main part of the touch screen panel shown in FIG. 2.

FIG. 4 is a schematic drawing illustrating an assembled cross-sectional view of a main part of the touch screen panel shown in FIG. 2. In FIG. 4, elements identical to those of FIGS. 2 and 3 are designated by same reference numerals, and their detailed descriptions will be omitted.

Referring to FIG. 4, the X-dummy patterns DX corresponding to the second sensing patterns 14 are formed in the dummy regions between the first sensing patterns 12, and the Y-dummy patterns DY corresponding to the first sensing patterns 12 are formed in the dummy regions between the second sensing patterns 14.

Therefore, the layers in which the first and second sensing patterns 12 and 14 are respectively formed have similar patterns corresponding to each other. Accordingly, light entering the touch screen panel 10 with the same incident angle is reflected (or transmitted) with an angle almost equal to the incident angle.

Although only an exemplary path along which external light entering the touch screen panel 10 is reflected by the second sensing patterns 14 and the Y-dummy patterns DY in the upper layer is shown in FIG. 4, light transmitted through the second sensing patterns 14 and the Y-dummy patterns DY is reflected in the same degree by the first sensing patterns 12 and the X-dummy patterns DX.

When light emitted from the bottom of the touch screen panel 10, e.g., the display panel (not shown) such as a liquid crystal display panel, is incident to the touch screen panel 10, the light is also reflected or transmitted in the same degree at all of the regions in which the first and second sensing patterns 12 and 14 are formed.

That is, with the X- and Y-dummy patterns DX and DY formed as described in the embodiment shown in FIGS. 1-4, the reflectance difference between the first and second sensing patterns 12 and 14 can be improved (e.g., reduced). Accordingly, a substantially uniform image can be displayed.

Furthermore, a transparent ground electrode 17 and a third insulating layer 18 covering the transparent ground electrode 17 may be further formed on the other surface opposite to the one surface of the transparent substrate 11 on which the sensing patterns 12 and 14 and the dummy patterns DX and DY are formed, e.g., the bottom surface of the transparent substrate 11. However, the transparent ground electrode 17 and/or the third insulating layer 18 may be omitted depending on the design of the touch screen panel according to some embodiments of the present invention.

The transparent ground electrode 17 may be used to secure stability between the touch screen panel 10 and the display panel. Alternatively, the transparent ground electrode 17 may be used to form capacitance between the transparent ground electrode 17 and the first and second sensing patterns 12 and 14 depending on the design of the touch screen panel 10 according to some embodiments of the present invention.

That is, in the touch screen panel 10, capacitance between the first and second sensing patterns 12 and 14 may be used to sense a contact position. Alternatively, capacitance between the transparent ground electrode 17 and the first and second sensing patterns 12 and 14 may be used to sense a contact position. The embodiments of the present invention may be variously modified.

FIGS. 5A to 5E are schematic drawings illustrating cross-sectional views sequentially illustrating a method of fabricating the touch screen panel shown in FIG. 4.

Figure 5A:
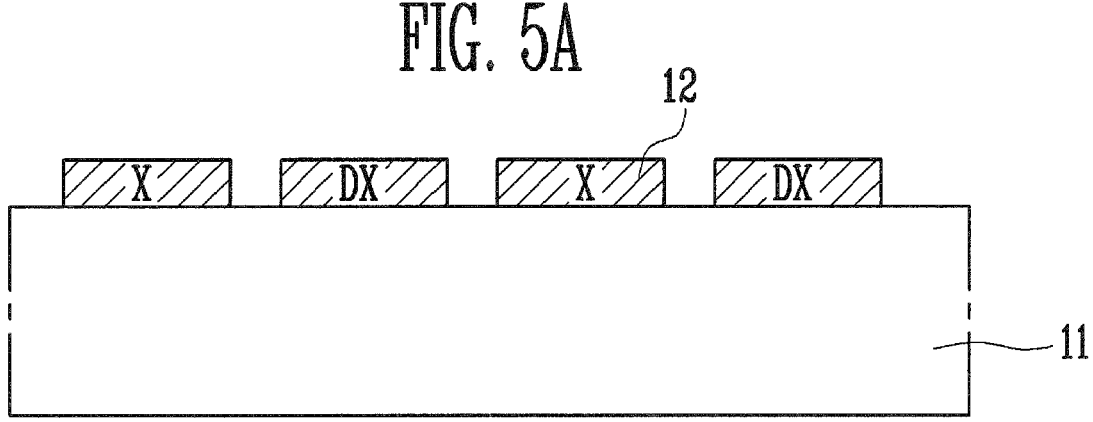
FIGS. 5A to 5E are schematic drawings illustrating cross-sectional views sequentially illustrating a method of fabricating the touch screen panel shown in FIG. 4.

Referring to FIG. 5A, the first sensing patterns 12 and the X-dummy patterns DX are formed by growing a transparent electrode material such as ITO on the transparent substrate 11 and then patterning the transparent electrode material. Although connecting portions of the first sensing patterns 12 are not shown in this figure so that the first sensing patterns 12 and the X-dummy patterns DX are clearly shown, the first sensing patterns 12 are patterned to be connected along a first direction (e.g., a column direction). Here, the X-dummy patterns DX are formed in dummy regions between the first sensing patterns 12.

Figure 5B:
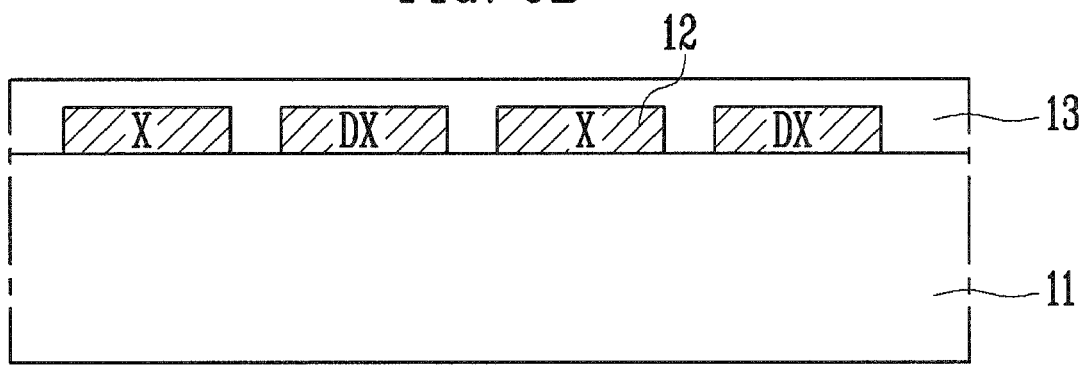

Thereafter, as shown in FIG. 5B, the first insulating layer 13 is formed by, for example, printing a first insulating material on the first sensing patterns 12 and the X-dummy patterns DX using a printing technique and then firing the first insulating material. The forming of the first insulating layer 13 using the printing technique is only one embodiment, and the present invention is not limited thereto. For example, it will be apparent that the first insulating layer 13 may be formed using a chemical vapor deposition (CVD) or sputtering technique according to some embodiments of the present invention.

Figure 5C:
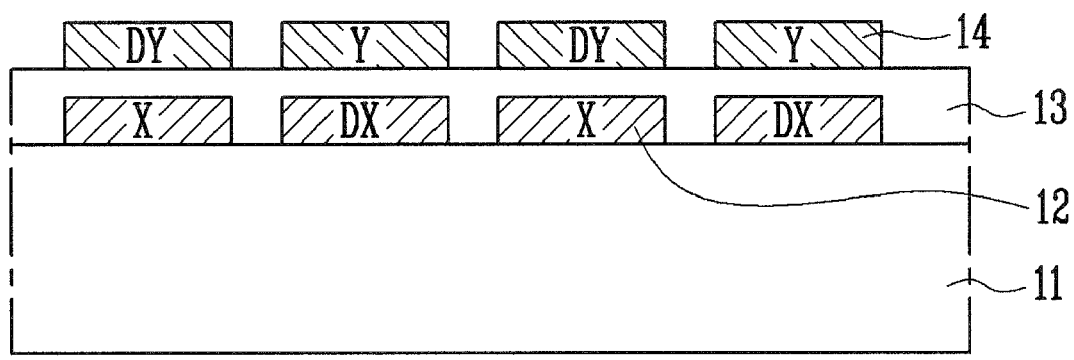

Thereafter, as shown in FIG. 5C, the second sensing patterns 14 and the Y-dummy patterns DY are formed by growing a transparent electrode material such as ITO on the first insulating layer 13 and then patterning the transparent electrode material. Here, the second sensing patterns 14 are disposed on the X-dummy patterns DX so as not to overlap with the first sensing patterns 12. However, connecting portions of the second sensing patterns 14 may not be disposed on the X-dummy patterns DX. The Y-dummy patterns DY are formed in dummy regions between the second sensing patterns 14. The Y-dummy patterns DY are disposed on the first sensing patterns 12 to overlap with the first sensing patterns 12. However, the Y-dummy patterns DY may not overlap with the connecting portions of the first sensing patterns 12. Although not shown in the drawings, the second sensing patterns 14 are patterned to be connected along a second direction (e.g., a row direction).

After the second sensing patterns 14 and the Y-dummy patterns DY are formed, metal patterns 15 shown in FIGS. 2 and 3 are formed using a low-resistance material having a lower surface resistance than that of a transparent electrode material such as a triple layer of Mo/Al/Mo or a chrome (Cr) layer.

Figure 5D:
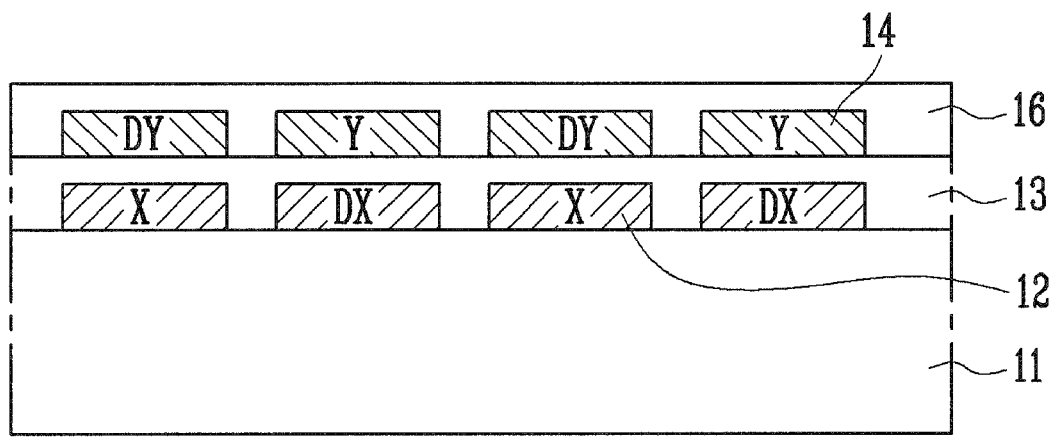

Thereafter, as shown in FIG. 5D, a second insulating layer 16 is formed by, for example, printing a second insulating material on the second sensing patterns 14, the Y-dummy patterns DY and the metal patterns (15 of FIGS. 2 and 3) using a printing, CVD or sputtering technique, and then firing the second insulating material.

Figure 5E:
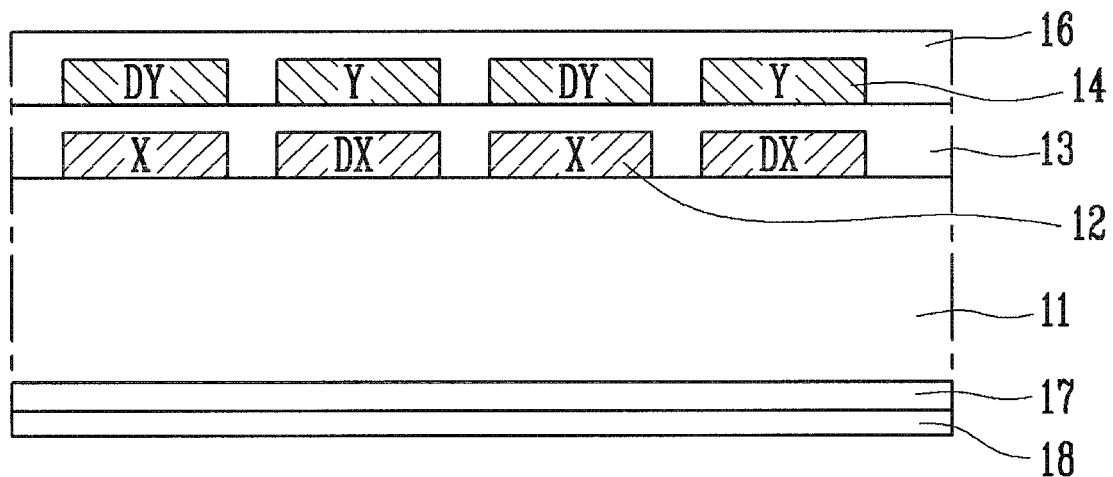

Thereafter, as shown in FIG. 5E, a transparent ground electrode 17 is grown on the entire bottom surface of the transparent substrate 11, and a third insulating layer 18 is formed to cover the transparent ground electrode 17 using, for example, a printing, CVD or sputtering technique.

In the embodiments of the present invention described with reference to FIGS. 2 to 5E, the X- and Y-dummy patterns DX and DY are in the dummy regions between the first sensing patterns 12 and in the dummy regions between the second sensing patterns 14, respectively. However, the present invention is not limited thereto.

Figure 6A:
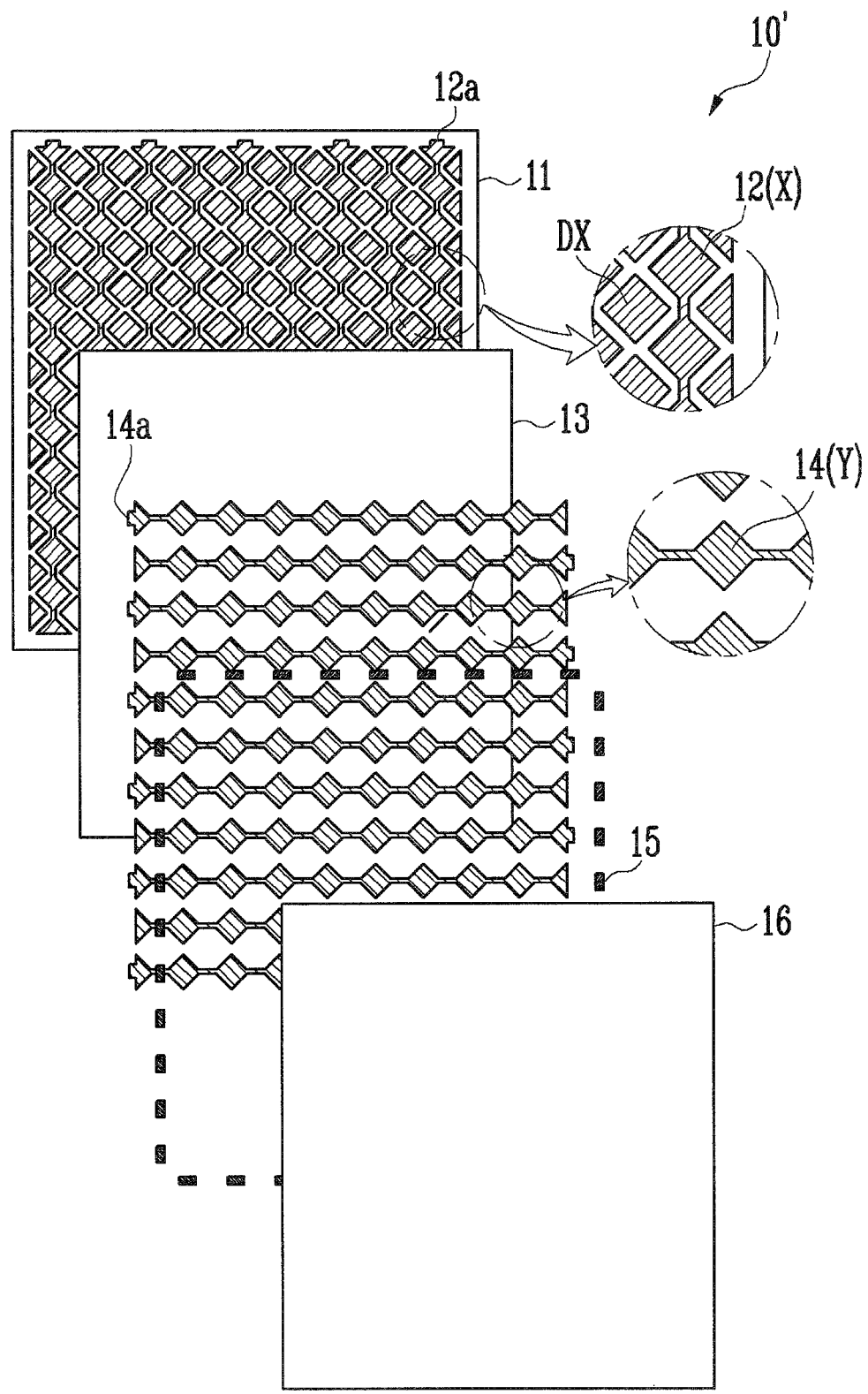
FIGS. 6A and 6B are schematic drawings illustrating exploded plan views of touch screen panels according to other embodiments of the present invention.
Figure 6B:
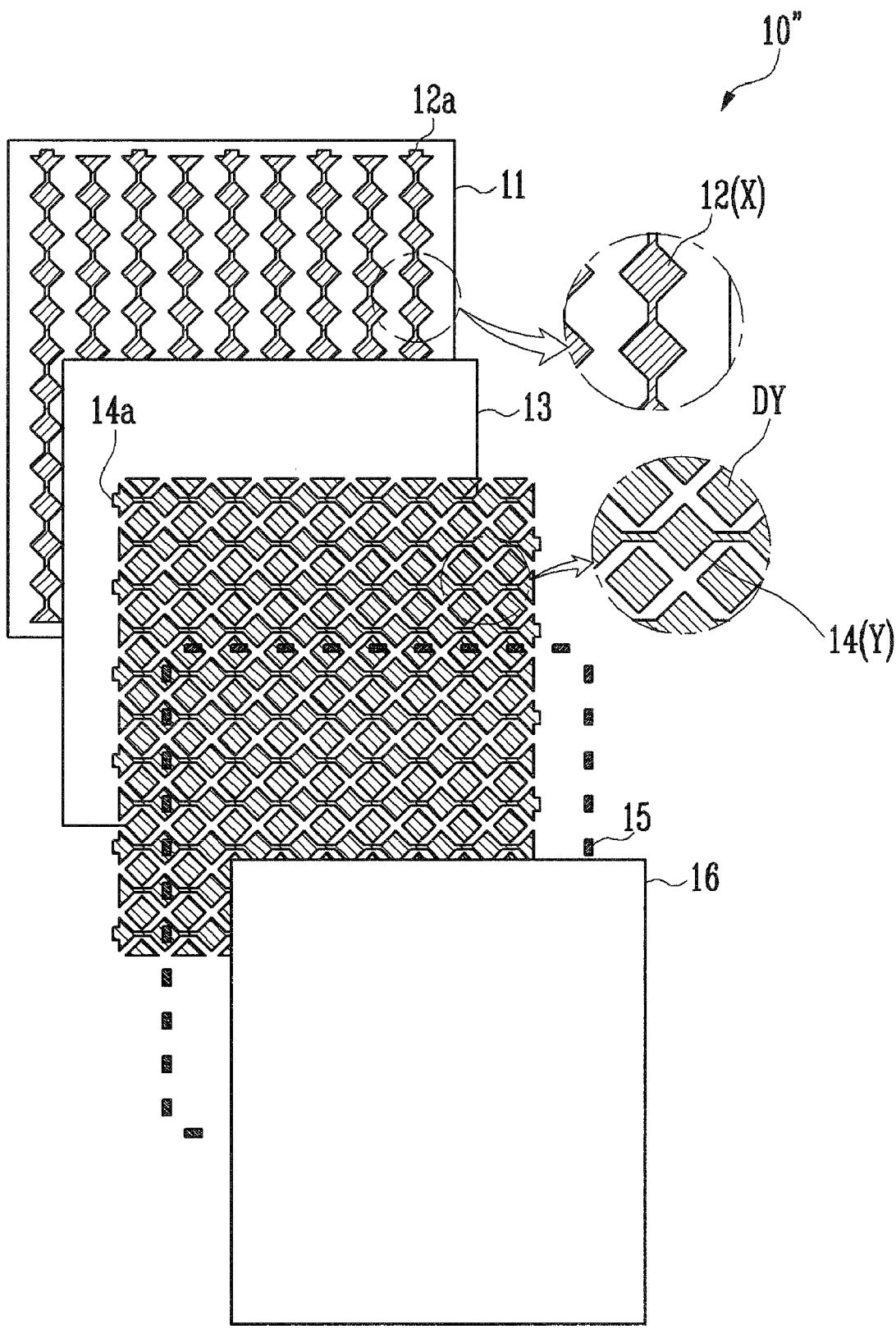

FIGS. 6A and 6B are schematic drawings illustrating exploded plan views of touch screen panels 10' and 10" according to two embodiments of the present invention.

For example, only the X-dummy patterns DX may be formed in the dummy regions between the first sensing patterns 12 as shown in FIG. 6A, or only the Y-dummy patterns DY may be formed in the dummy regions between the second sensing patterns 14 as shown in FIG. 6B.

In this case, the first and second sensing patterns 12 and 14 may be formed of different transparent electrode materials, respectively. The X- or Y-dummy patterns DX or DY may be selectively disposed in the regions between the first sensing patterns 12 or the regions between the second sensing patterns 14 so as to reduce a reflectance difference between the first and second sensing patterns 12 and 14.

Figure 7:
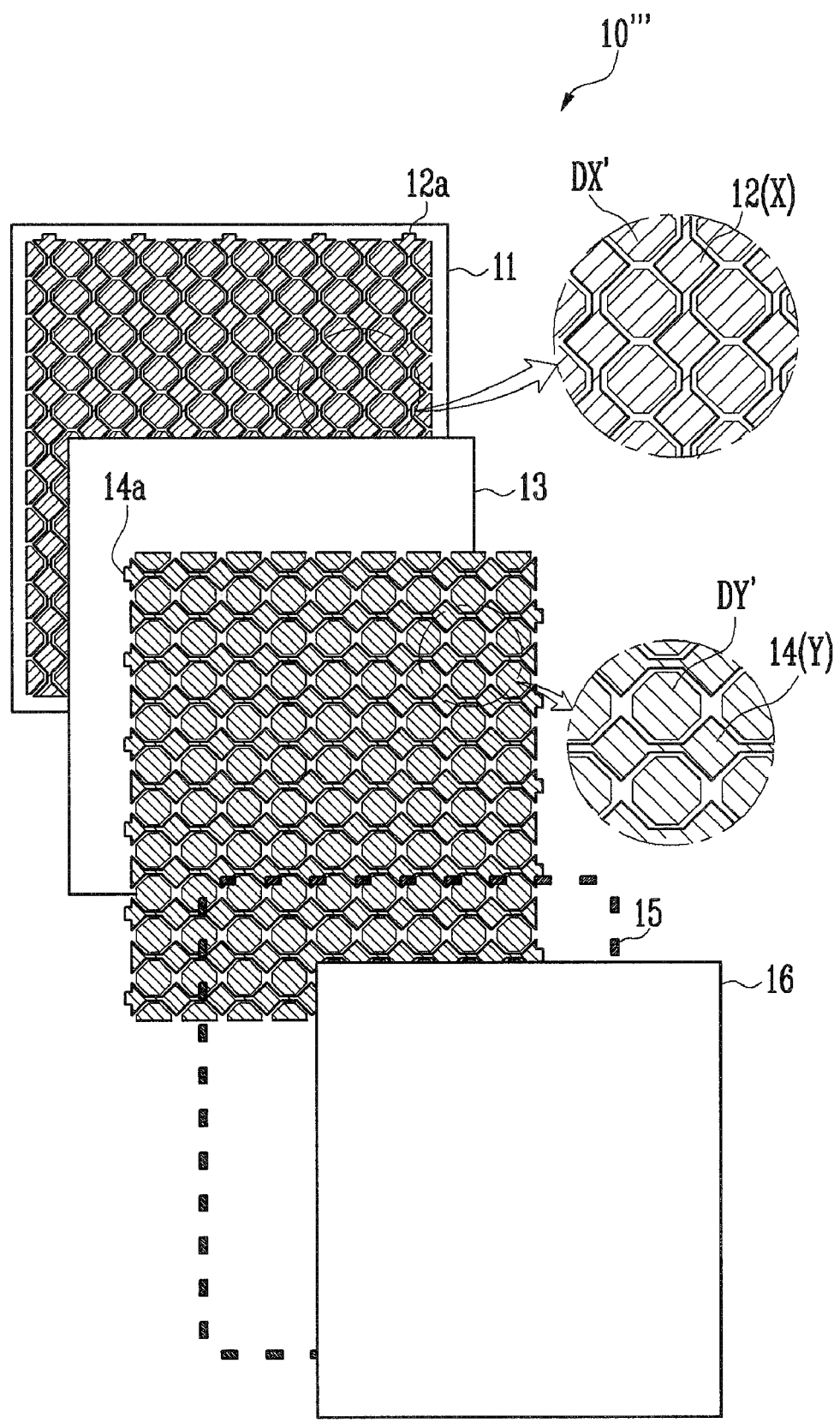
FIG. 7 is a schematic drawing illustrating an exploded plan view of a touch screen panel according to still another embodiment of the present invention.
Figure 8:
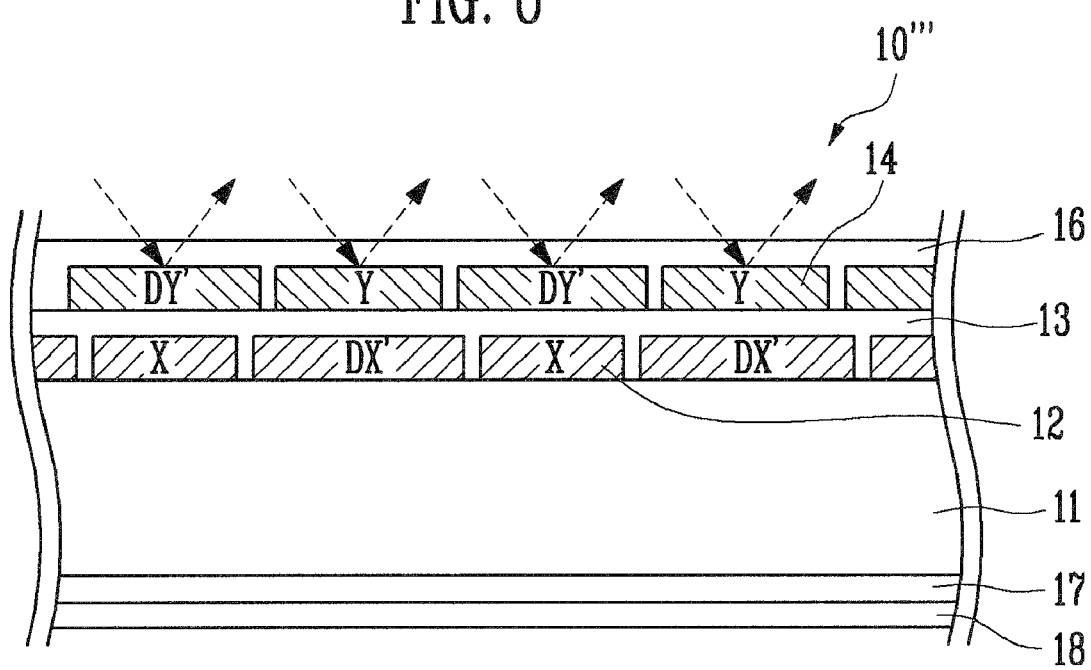
FIG. 8 is a schematic drawing illustrating an assembled cross-sectional view of the touch screen panel shown in FIG. 7.

FIG. 7 is a schematic drawing illustrating an exploded plan view of a touch screen panel according to still another embodiment of the present invention. FIG. 8 is a schematic drawing illustrating an assembled cross-sectional view of the touch screen panel shown in FIG. 7. In FIGS. 7 and 8, detailed descriptions of elements identical to those of the aforementioned embodiments will be omitted.

Referring to FIGS. 7 and 8, X- and Y-dummy patterns DX' and DY' are extensively formed to be more adjacent (or closer) to the first and second sensing patterns 12 and 14, respectively. For example, the X- and Y-dummy patterns DX' and DY' may be formed so that intervals between the X- and Y-dummy patterns DX' and DY' and the first and second sensing patterns 12 and 14, respectively, are 5 to 20 μm. Here, the shape of the X- and Y-dummy patterns DX' and DY' may be modified to match the shape of connecting portions of the first and second sensing patterns 12 and 14 at surroundings of the connecting portions of the first and second sensing patterns 12 and 14, respectively.

As shown in FIG. 8, portions of edge regions of the X- and Y-dummy patterns DX' and DY' may be overlapped with each other. Here, the X- and Y-dummy patterns DX' and DY' are alternately disposed on a transparent substrate 11 and a first insulating layer 13, respectively. Accordingly, it is possible to prevent (i.e., reduce) degradation of image quality, caused when linear gaps between the first and second sensing patterns 12 and 14 and the X- and Y-dummy patterns DX' and DY' are recognized on a plane by users.

While the present invention has been described in connection with certain exemplary embodiments, it is to be understood that the present invention is not limited to the disclosed embodiments, but, on the contrary, is intended to cover various modifications and equivalent arrangements included within the spirit and scope of the appended claims, and equivalents thereof.

What is claimed is:
1. A touch screen panel comprising:
   a transparent substrate;

a plurality of first sensing patterns on the transparent substrate and connected to each other along a first direction;
a first insulating layer on the first sensing patterns;
a plurality of second sensing patterns on the first insulating layer and connected to each other along a second direction, the second sensing patterns being alternately disposed with the first sensing patterns and not overlapped with the first sensing patterns; and
a plurality of dummy patterns in at least one of first dummy regions between the first sensing patterns or second dummy regions between the second sensing patterns,
wherein each of the first sensing patterns has at least three sides, and a corresponding one of the plurality of dummy patterns is located adjacent to each one of the at least three sides.

2. The touch screen panel as claimed in claim 1, wherein the dummy patterns are formed of the same material as the first sensing patterns on the transparent substrate, and are beneath the second sensing patterns and overlap with the second sensing patterns.

3. The touch screen panel as claimed in claim 1, wherein the dummy patterns are formed of the same material as the second sensing patterns on the first insulating layer, and are on the first sensing patterns and overlap with the first sensing patterns.

4. The touch screen panel as claimed in claim 1, wherein the dummy patterns are separated from each other.

5. The touch screen panel as claimed in claim 1, wherein the dummy patterns comprise a plurality of first dummy patterns on the transparent substrate in the first regions between the first sensing patterns, and a plurality of second dummy patterns on the first insulating layer in the second dummy regions between the second sensing patterns.

6. The touch screen panel as claimed in claim 5, wherein:
the first dummy patterns overlap with the second sensing patterns, and the second dummy patterns overlap with the first sensing patterns;
the first dummy patterns and the second dummy patterns alternately on the transparent substrate and the first insulating layer; and
portions of edge regions of the first dummy patterns and the second dummy patterns overlap with each other.

7. The touch screen panel as claimed in claim 1, wherein the first sensing patterns, the second sensing patterns and the dummy patterns comprise a transparent electrode material.

8. The touch screen panel as claimed in claim 1, wherein:
first sensing patterns of the plurality of first sensing patterns having the same X-coordinate are connected together in a column, and second sensing patterns of the plurality of second sensing patterns having the same Y-coordinate are connected together in a row; and
the touch screen panel further comprises a plurality of metal patterns at an edge region for electrically connecting the first sensing patterns and the second sensing patterns on the column or the row, respectively, to position detecting lines.

9. The touch screen panel as claimed in claim 1, further comprising at least one of a second insulating layer on the second sensing patterns, a transparent ground electrode or a third insulating layer, the transparent ground electrode and/or the third insulating layer being on a surface of the transparent substrate opposite to another surface on which the first sensing patterns are located.

10. A method of fabricating a touch screen panel, the method comprising:
forming a plurality of first sensing patterns on a transparent substrate, the plurality of first sensing patterns connected to each other along a first direction;
forming a first insulating layer on the first sensing patterns;
forming a plurality of second sensing patterns on the first insulating layer, the plurality of second sensing patterns connected to each other along a second direction, the second sensing patterns being alternately disposed with the first sensing patterns and not overlapped with the first sensing patterns; and
forming a plurality of dummy patterns in at least one of first dummy regions between the first sensing patterns or second dummy regions between the second sensing patterns,
wherein each of the first sensing patterns has at least three sides, and a corresponding one of the plurality of dummy patterns is located adjacent to each one of the at least three sides.

11. The method as claimed in claim 10, wherein the dummy patterns comprise first dummy patterns in the first dummy regions between the first sensing patterns on the transparent substrate and second dummy patterns in the second dummy regions between the second sensing patterns on the first insulating layer, and the first dummy patterns and the second dummy patterns are alternately on the respective transparent substrate and the first insulating layer, and
portions of edge regions of the first dummy patterns and the second dummy patterns overlap with each other.

12. The method as claimed in claim 10, further comprising forming a second insulating layer on the second sensing patterns.

13. The touch screen panel as claimed in claim 1, wherein two adjacent sensing patterns of the plurality of first sensing patterns are connected to each other by an elongated portion extending in the first direction, the elongated portion having a width that is narrower than that of the two adjacent sensing patterns.

14. The touch screen panel as claimed in claim 1, wherein two adjacent sensing patterns of the plurality of second sensing patterns are connected to each other by an elongated portion extending in the second direction, the elongated portion having a width that is narrower than that of the two adjacent sensing patterns.

* * * * *